United States Patent [19]

Mons et al.

[11] Patent Number: 4,700,307
[45] Date of Patent: Oct. 13, 1987

[54] FEATURE NAVIGATION SYSTEM AND METHOD

[75] Inventors: Barend Mons, Solana Beach; Donald H. Flowers, La Mesa; Robert L. Henderson, San Diego, all of Calif.

[73] Assignee: General Dynamics Corp./Convair Division, San Diego, Calif.

[21] Appl. No.: 514,210

[22] Filed: Jul. 11, 1983

[51] Int. Cl.⁴ ............................................. G01F 15/50
[52] U.S. Cl. .................................. 364/453; 364/456; 364/457; 342/64
[58] Field of Search ...................... 364/453, 456, 457; 358/103; 343/5 MM; 342/64, 54, 55

[56] References Cited

U.S. PATENT DOCUMENTS

| | | | |
|---|---|---|---|
| 2,541,277 | 2/1951 | Omberg | 364/456 |
| 3,328,795 | 6/1967 | Hallmark | 343/5 MM |
| 3,636,323 | 1/1972 | Salisbury et al. | 364/453 |
| 3,879,728 | 4/1975 | Wolff | 343/5 MM |
| 4,175,285 | 11/1979 | Dansac et al. | 364/456 |
| 4,347,511 | 8/1982 | Hofmann et al. | 343/5 MM |
| 4,368,456 | 1/1983 | Forse et al. | 343/5 MM |
| 4,494,200 | 1/1985 | Lam | 343/5 MM |

OTHER PUBLICATIONS

S 20060044 (10/80) Lerche, "Onboard and Ground Test of Autonomous Navigation System Based on Terrain Correlation".
S 21110031, Optical Eng. (4/82) vol. 21, No. 2, pp. 370–375, Dron.

Primary Examiner—Salvatore Cangialosi
Attorney, Agent, or Firm—John R. Duncan, Jr.

[57] ABSTRACT

A method of navigating an airborne vehicle using observation of linear features such as roads, railroads, rivers or the like. Maps of linear features in several discrete areas along an intended flight path are prepared and entered into an on-board computer memory. The vehicle typically uses an inertial navigation system during flight from the origin to the first mapped area. Imaging sensors and on-board processing detect linear features as the vehicle approaches or passes over them. The sensed feature pattern network is compared to the reference mapped feature network to update the inertial navigation system to generate guidance commands. Frequent updates at other mapped areas keep the vehicle on course. This system is also capable of navigation updates from single linear features when the flight path is fairly well known, and of tracking a linear feature for terminal guidance. In these cases, only a small number of feature parameters need to be stored, rather than an area map. Linear feature navigation can be used by any manned or unmanned airborne vehicle which has the on-board capability to detect the required features.

25 Claims, 11 Drawing Figures

FEATURE NAVIGATION SYSTEM AND METHOD

BACKGROUND OF THE INVENTION

This invention relates in general to aircraft navigation and, more specifically, to a navigation system using sequences of linear feature navigation updates to correct a basic inertial navigation system.

In the earliest days of aviation, cross-country navigation consisted merely of the pilot flying at low altitudes and low speeds while observing the countryside. Sometimes, pilots would simply use a roadmap and follow roads or railways between towns or airports. Of course, this method was poorly suited for night or bad weather flying, and could no longer be used as aircraft became faster and flew at higher altitudes. In those days, unmanned missiles were incapable of inflight guidance or navigation updating, flying a ballistic trajectory from launch.

Later, a variety of radio beacons and the like were developed to aid commercial airline and private aircraft navigation. Still, no truly accurate method of navigating unmanned vehicles was available and long-distance military airplanes, e.g., bombers, had to rely on stellar navigation.

The development of inertial navigation using precision accelerometers and gyroscopes greatly increased the accuracy of navigating aircraft, manned and unmanned, over long distances. While these systems are generally sufficiently accurate for manned aircraft, where the pilot could use visual aids to correct for small errors near the target, destination airport, etc., they have sufficient gyro drift and other errors to cause significant target error for unmanned vehicles, such as cruise missiles, flying long distances.

The next advance in aircraft navigation was terrain following navigation, useful for low flying aircraft, missiles, etc.. Here, an inertial navigation system is used to keep the air vehicle nearly on the intended flight path. A terrain elevation map, which had been earlier prepared, of selected areas along the flight path is stored in computer memory. As the vehicle approaches the mapped area, a radar altimeter senses changes in ground contour and compares them to the stored terrain map. The computer matches the actual sensed terrain with one path across the mapped area, determining the actual flight path and the degree of error. The inertial navigation system is thus updated to return the vehicle to the intended flight path. A similar method used digital scene matching. This technique compares a sensed scene, taken by a TV sensor, with a reference scene.

While highly accurate, these systems have a number of problems and deficiencies. Preparing a digital scene matching map of a selected area is a very tedious and expensive undertaking. The map must be prepared from very high quality stereoscopic photographs taken over areas generally controlled by a potential enemy. The digital map uses a great deal of computer storage capability. In some cases, changes in terrain, e.g. snow cover, trees in or out of leaf, etc. may confuse the vehicle sensors. Good reference scenes, i.e. areas having sufficiently rough terrain, may not be available along the desired route. In the case of a warplane or missile, the areas with "good" terrain features near a likely target may be obvious to both sides. If these regions are isolated, an attacking plane or missile must be "funnelled" through them to provide high navigation accuracy. The enemy may be able to concentrate his defenses in these regions to thwart an attack.

Thus, there is a continuing need for improved aircraft navigation systems, particularly for unmanned missiles which must travel long distances at low altitudes to precisely impact a target.

SUMMARY OF THE INVENTION

The above problems, and others, are overcome by an airborne vehicle navigation method in which maps of linear features (e.g., roads, railroads, canals, or the like) are prepared and stored in memory covering discrete areas along a proposed flight path. The vehicle is launched and flown towards the first area by another navigation system, such as inertial navigation and sensors, and sensors on the vehicle detect linear ground features as the vehicle passes over them and compares them to the mapped features to determine the accumulated navigation error between launch and the first mapped area. The path of the vehicle is corrected to compensate for the error and the vehicle is directed toward the next mapped area.

Where the actual flight path is fairly well known, navigation updates can be made from single linear features. Also, the vehicle can track along a single linear feature, if desired.

In this manned or unmanned aircraft is extremely accurately guided to a destination or target.

BRIEF DESCRIPTION OF THE DRAWING

Details of the invention, and of preferred embodiments thereof, will be further understood upon reference to the drawing, wherein.

DETAILED DESCRIPTION OF THE DRAWING

Figure 1:
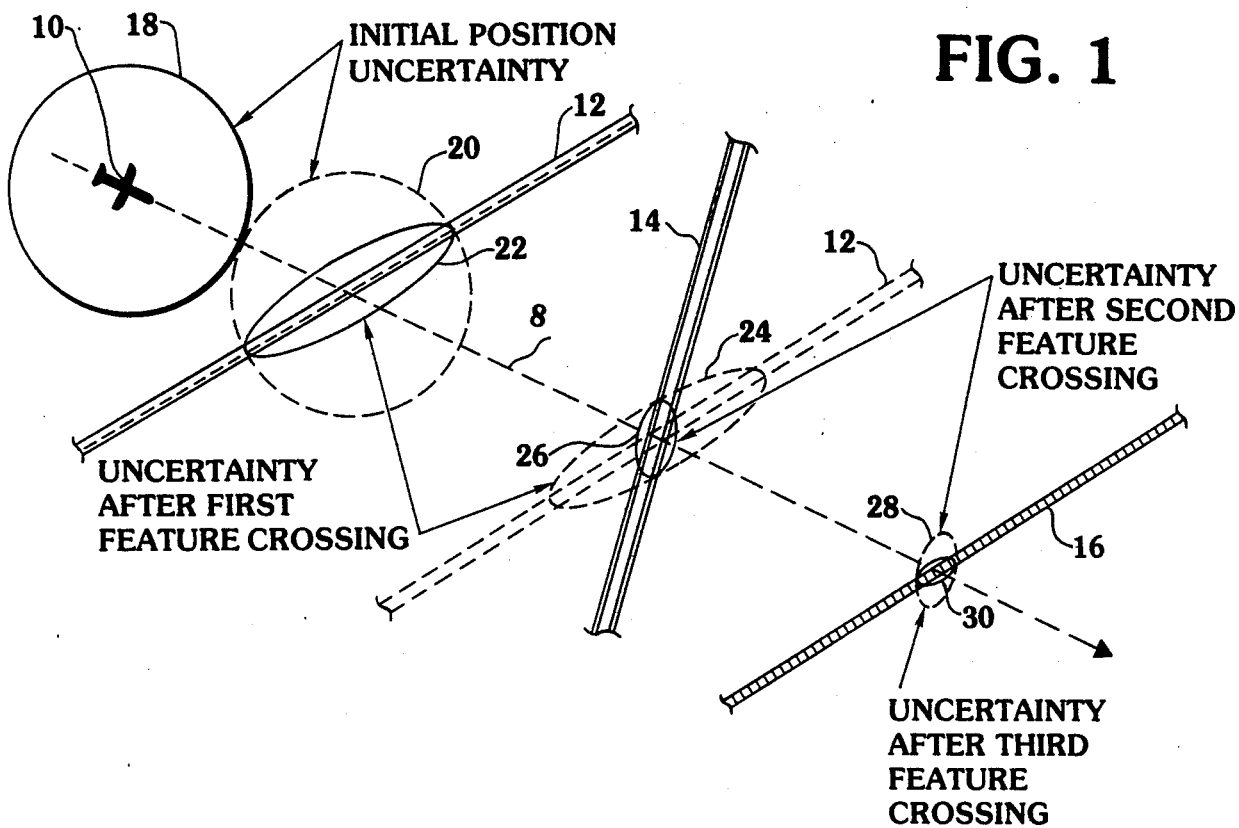
FIG. 1 is a schematic representation of an airborne vehicle flight path using linear feature recognition.

Referring now to FIG. 1, there is seen a schematic representation of the flight path 8 of an airborne vehicle 10 (here, a cruise missile) past three linear geographic features, a road 12, a canal 14 and a railroad 16.

Vehicle 10 has been flying under some conventional navigation system such as inertial navigation, which is sufficiently precise so that it is known that the vehicle is somewhere within an area of initial position uncertainty indicated by solid circle 18. The degree of uncertainty in this case is sufficiently limited that it is known that road 12 is the first linear feature being encountered.

At the first crossing, the sensor on vehicle 10 detects the presence and direction of road 12. The sensor may be an imaging infrared laser radar, a video camera or the like. Since it is not known precisely where road 12 is crossed, position uncertainty is reduced only in the direction perpendicular to the road. This reduction is illustrated by the change from the initial circular area (indicated by broken circle 20) to the solid ellipse 22 at the first feature crossing. The width of this ellipse 22 depends only on processing and reference map errors, while the length is determined by intersection of road 12 with the initial uncertainty circle 20.

As vehicle 10 continues along flight path 8, the second linear feature, canal 14, is crossed. When the second crossing is detected, the navigation error ellipse from the first crossing is intersected with canal 14 as indicated by second broken ellipse 24. Since the second feature (canal 14) is not parallel to the first (road 12), the resulting uncertainty indicated by second solid ellipse 26 is again reduced in size. For clarity of illustration, a broken line indication of road 12 is shown with broken ellipse 24. When vehicle 10 reaches railroad 16, the navigation error ellipse 28 is again reduced to solid ellipse 30 having a length along railroad 16 which intersects broken ellipse 18. Continuing indefinitely, each linear feature in sequence reduces the vehicle's position error to a value which approaches the reference location (mapped feature location) error. The only constraint is that the sequence of crossed linear features not be parallel.

When sufficient linear features have been detected to reduce the position error to a selected precision, the vehicle flight path deviation from the desired flight path is known and the vehicle inertial navigation system can be corrected to return the vehicle to the desired flight path.

When the vehicle position error is extremely large, such as after a long over-water flight or before the first navigation update is made, it may not be known which of the mapped linear features is being detected. For example, if a road and a canal intersect on the map, it may not be known whether the first feature is the canal on one side of the intersection point or the road on the other side. Or, the vehicle might be further downrange than expected and be past the expected feature when feature sensing is begun. In second case a feature sequence matching technique as schematically illustrated in a simple one-dimensional example in FIG. 2 may be used.

The technique illustrated in FIG. 2 depends only on detecting a linear feature crossing, not on detecting orientation. The "one-dimensional" locating method illustrated in FIG. 2 is suitable where the flight path is known with some accuracy, but the distance traveled is relatively known. The initial uncertainty is schematically indicated by the area within broken line 31. Here, the instant vehicle 10 crosses a linear feature the current position is recorded and saved in memory. In this example, as begun in FIG. 2(a), the uncertainty in the downrange direction is so large that vehicle 10 (indicated by solid dot 32) could be anywhere along flight path 34 between any of the linear future crossings 36 and 48.

As vehicle 10 moves along flight path 34, it crosses a first linear feature, which could be any of the features 36 and 48, as indicated by the open dots 50–62. Vehicle 10 has actually moved to feature 44, but its location has not yet been ascertained by the vehicle.

Figure 2A:
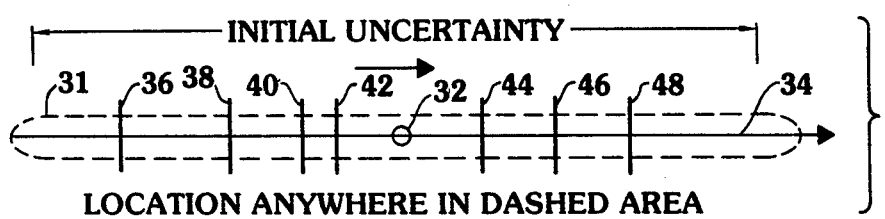
FIGS. 2(a) through 2(d) form a simplified schematic chart illustrating downtrack position determination through a series of linear feature crossings.
Figure 2B:
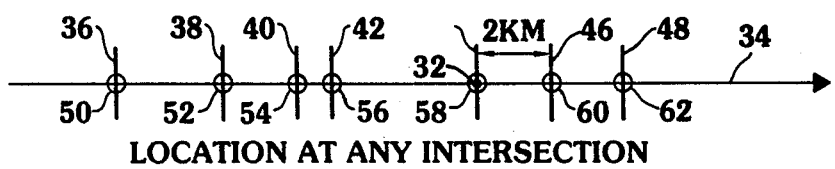
Figure 2C:
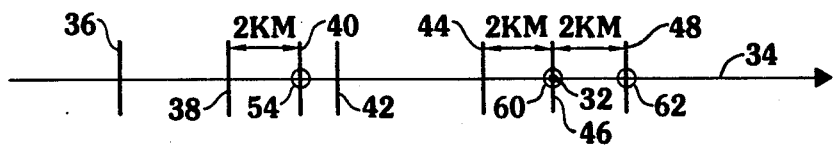

Vehicle 10, continuing along flight path 34, crosses the next linear feature at line 46, here 2 kilometers from the first. As illustrated in FIG. 2(c), there are three pairs of crossings spaced substantially 2 KM apart, 28–30, 44–46 and 46–48. Thus, vehicle 10 could be at any of three locations 54, 60 and 62. While vehicle 10 now is actually at line 46, this position is still not confirmed.

Figure 2D:
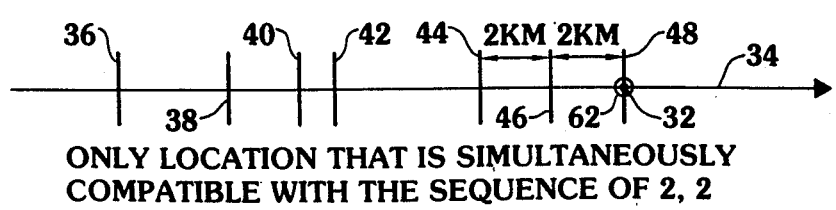

When vehicle 10 continues down flight path 34 and reaches a third crossing at line 48 as shown in FIG. 2(d), the distance to the third crossing is recorded. In this example, the distance between second and third crossings is again 2 kilometers. When compared to the map, it is found that two consecutive 2 KM distances between crossing occurs at only one map region, proving that the vehicle is now at the line 48. In order to eliminate any possible errors, the accuracy of the position determination can be confirmed by adding fourth, fifth, or more, crossing correlations.

Figure 3A:
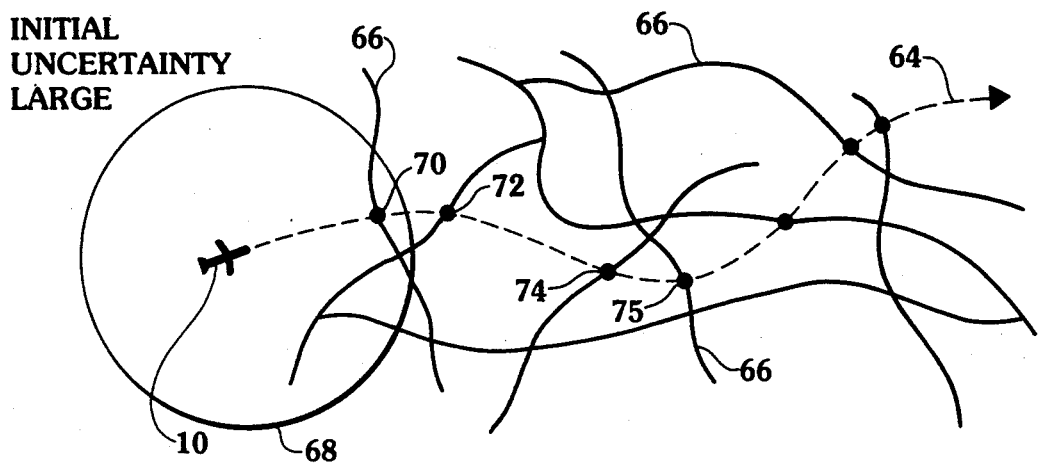
FIGS. 3(a) and 3(b) are schematic representations of an airborne vehicle's flight path over a number of linear features where the initial position error is very large (considering both downtrack and crosstrack errors)

The "one-dimensional" method illustrated in FIG. 2 can be extended to a two-dimensional map network to provide practical navigation positioning for airborne vehicles with a large, two-dimensional area of initial uncertainty. FIG. 3 schematically illustrates an airborne vehicle 10 flying along flight path 64 over a mapped area having many intersecting linear features generally designated 66. The initial position of vehicle 10 could be anywhere within initial uncertainty circle 68. Until the actual vehicle position is determined, circle 68 moves with vehicle 10 as vehicle 10 flys along path 64. When vehicle 10 crosses the first feature at point 70, the crossing is recorded and saved. When the vehicle 10 crosses the second linear feature 66 at point 72, vehicle sensors will record the distance and compass heading between points 70 and 72, which give a position change vector $\Delta$. All positions on the map which correspond to a feature crossing simultaneously at points 70 and 72 can be determined by shifting the map network through an X, Y (i.e., vector) distance $\Delta$ and recording all intersection positions.

Figure 3B:
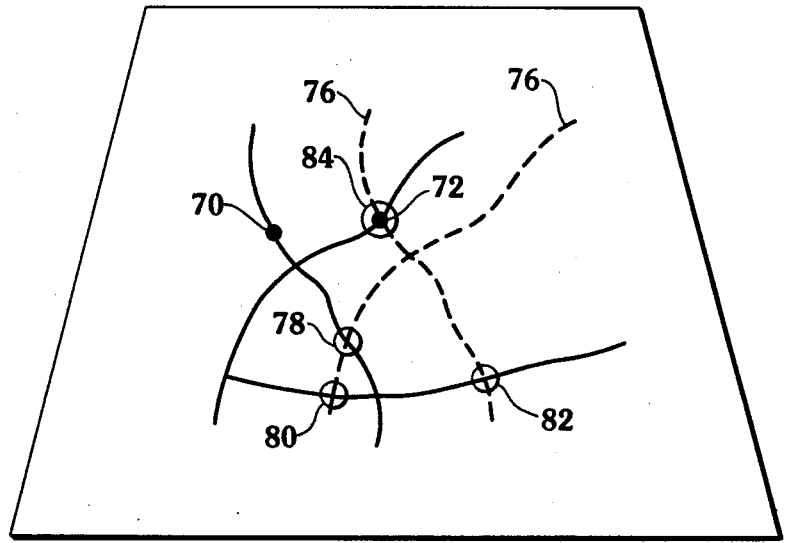

FIG. 3(b) illustrates the first step in this process, with the shifted map being shown in broken lines generally at 76. The vehicle here is moving from left to right, from point 70 to point 72 as in FIG. 3(a). The shift distance and angle corresponds to $\Delta$. Each point where the shifted map features cross the original map feature, here points 78, 80, 82 and 84, define possible vehicle positions. Each of these points can be thought of as having earned "one vote". By continuing the process by making similar map position change vector shifts from point 72 to point 74, from point 74 to point 75, to an "$N^{th}$" point, etc., "votes" for additional locations occur. Votes at incorrect locations tend to be randomly distributed and do not accumulate. Eventually, the votes converge to the actual location, at the $N^{th}$ point, where N is selected to give the desired certainty, considering variables such as map accuracy, etc.

Figure 4:
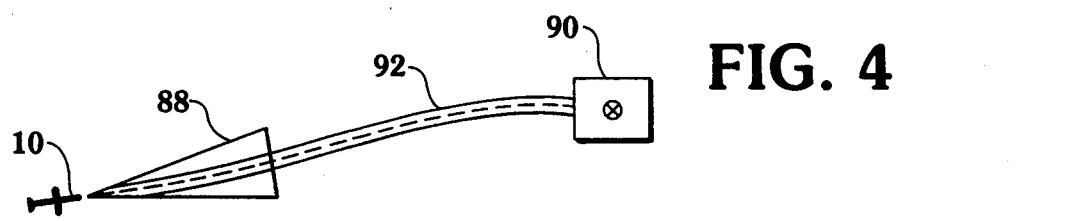
FIG. 4 is a schematic representation of the use of a linear feature leading directly to the destination.
Figure 5:
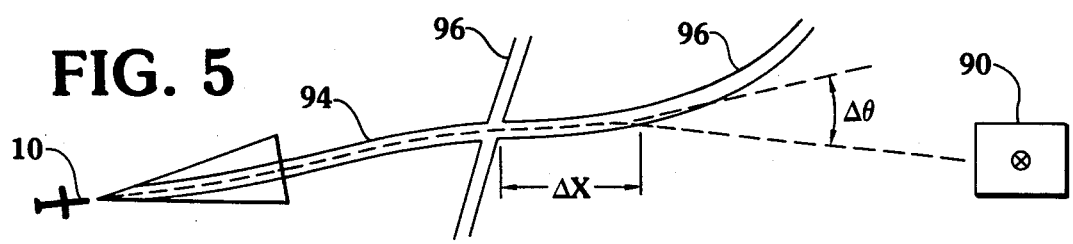
FIG. 5 is a schematic representation of the use of a linear feature leading to an area near the destination.

In the linear feature navigation methods described above, the airborne vehicle navigates to the terminal point using basically inertial navigation with periodic linear feature navigation updates and corrections. However, if desired, the linear feature navigation method can be used directly for terminal guidance. As seen in FIGS. 4 and 5 the sensors and on-board processing of vehicle 10 can detect the position of a linear feature relative to the vehicle and create guidance commands which cause the linear feature to be tracked. As seen in FIG. 4, the sensors cover a generally fan-shaped area 88 ahead of vehicle 10. If the linear feature leads directly to the terminal point 90, such as road 92 in FIG. 4, vehicle can follow it all the way. Alternately, as seen in FIG. 5, a straight segment 94 of a road, which passes close to terminal point 90 and has a crossing linear feature 96, can be used as a "gun barrel" which points the vehicle towards terminal point 90. In this gun barrel mode, as vehicle 10 flies along rod 94, it is caused to fly a straight path by straight segment 94 and senses cross road 96. The vehicle controller can be set to perform a preplanned turn maneuver at a selected distance $\Delta X$ downrange of cross road 96. The preplanned turn of $\Delta \theta$ degrees will aim vehicle 10 directly at terminal point 90, which could be a target for a cruise missile vehicle 10 or an airport approach where vehicle 10 is a manned airplane. This technique requires that the relative position between the linear features and the terminal point be accurately known.

Figure 6:
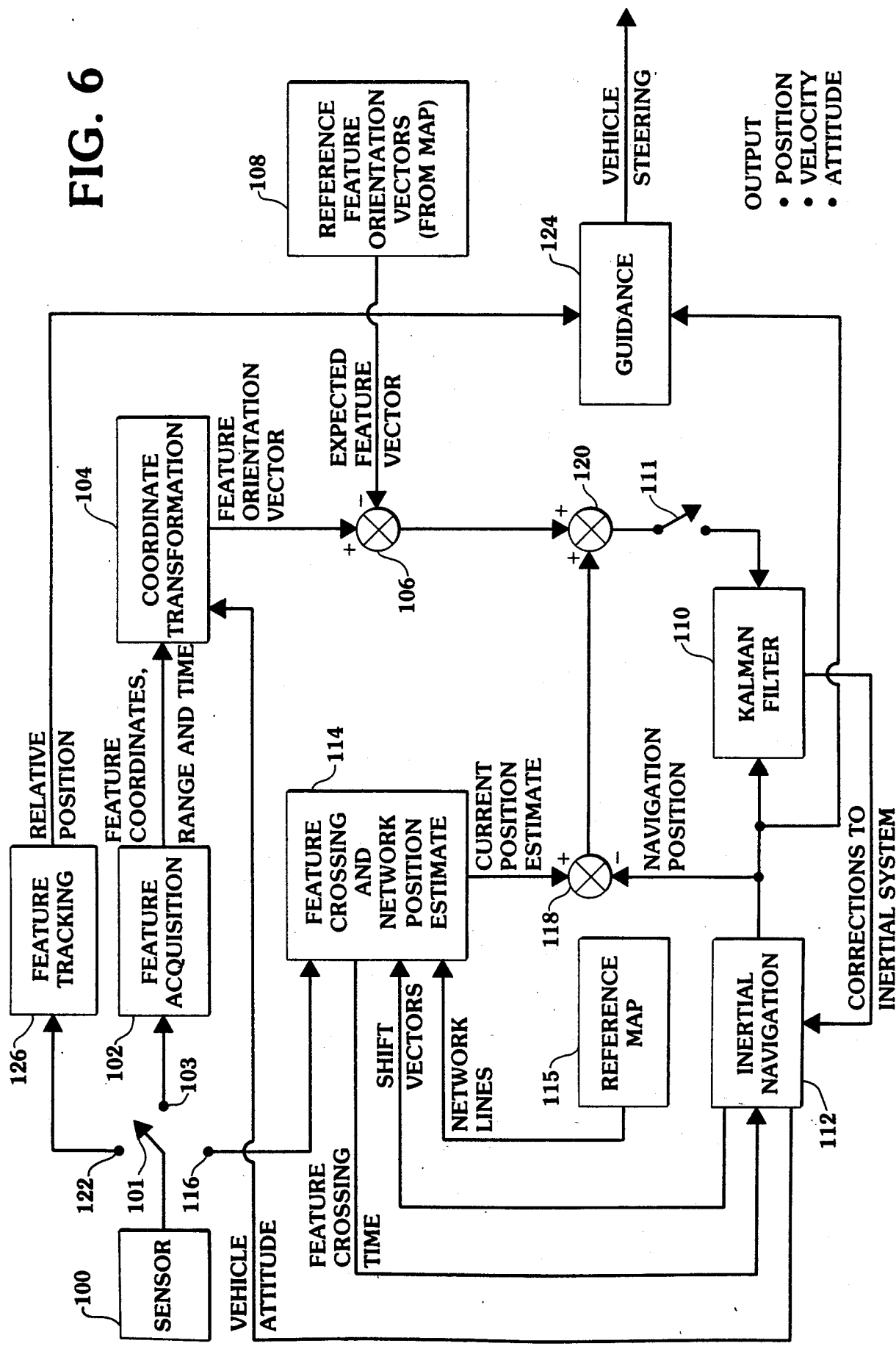
FIG. 6 is a schematic block diagram of the integrated linear feature navigation system.

The components of the linear feature navigation system and their operational relationships are provided in block diagram form in FIG. 6. The components used in the system are all conventional, used for other purposes in present missile and aircraft systems.

An imaging sensor 100, such as laser radar or a television camera provides images of linear features below the vehicle which are processed by an image acquisition and/or tracking algorithm. In the feature acquisition mode 102, with switch 101 connected to contact 103 the on-board processing algorithm determines two separated points which define the feature orientation/position relative to the sensor image frame. Such algorithms have been described by M.A. Fischler et al., "Detection of Roads and Linear Structures In Aerial Imagery by Computer" Proceedings: Image Understanding Workshop, November 1979, available from Science Applications Inc., Report No. SAI-80-974-WA. The feature orientation is converted to navigation coordinates using vehicle altitude information from the inertial navigation system and range information, if available. If a passive sensor is used as sensor 100, this coordinate transformation 104 will be accurate if the sensor is pointed straight down. If passive forward looking sensing is used, the range to the image must be estimated from on-board inertial navigation data. Alternately, if sensor 100 is an active sensor such as a laser radar system, direct range estimates will be provided. A navigation update measurement is determined by differencing at signal point 106 the sensed linear feature orientation vector with the reference orientation vector 108 of the feature stored in the vehicle's guidance system. This measurement is proved by a conventional Kalman filter 110 (as described in Chapters 4 and 5 of "Applied Optimal Estimation", edited by Arthur Gelb, Analytic Sciences Corp., MIT, 1974,) through closed switch 111 to update the vehicle's estimate to update the vehicle's estimate of position, velocity and guidance modeling parameters (gryo drift, etc.) which are used in the on-board inertial navigation system 112.

In the feature crossing and network position estimate mode (box 114) with switch 101 closing the circuit to contact 116, each feature crossing detected by the image processing algorithm sends a feature crossing indicator time flag to the inertial navigation system 112 so that the current position of the vehicle is marked. This provides vector position shift information fed back from inertial navigation 112 to network position estimate 114, together with the reference map 115, which is used to determine the candidate positions used in the voting procedures described above. The current position estimate from this procedure is differenced at signal point 118 with the current navigation position estimate to form the measurement which is applied to Kalman filter 110 through signal point 120 and, after corrections from Kalman filter 110 are returned to navigation 112, to vehicle guidance 124.

In the feature tracking mode, switch 101 is connected through contact 122 to the feature tracking system 126 with the algorithm operating directly on image data to determine the feature position in the image frame. Any conventional line tracking method may be used such as that described in the Fischer et al. article referenced above. The image position in the frame is fed to guidance 124, which steers the vehicle to keep the image centered in the frame. In the "gun-barrel" tracking mode described above the vehicle needs to know the correct downrange point at which to execute the $\Delta$ turn (as shown in FIG. 5 to achieve precision overflight of the terminal point. This can be determined by monitoring the distanced traveled ($\Delta X$) beyond the cross-feature update (road 96 in FIG. 5), or by observing when the feature begins to turn out of the image.

Figure 7:
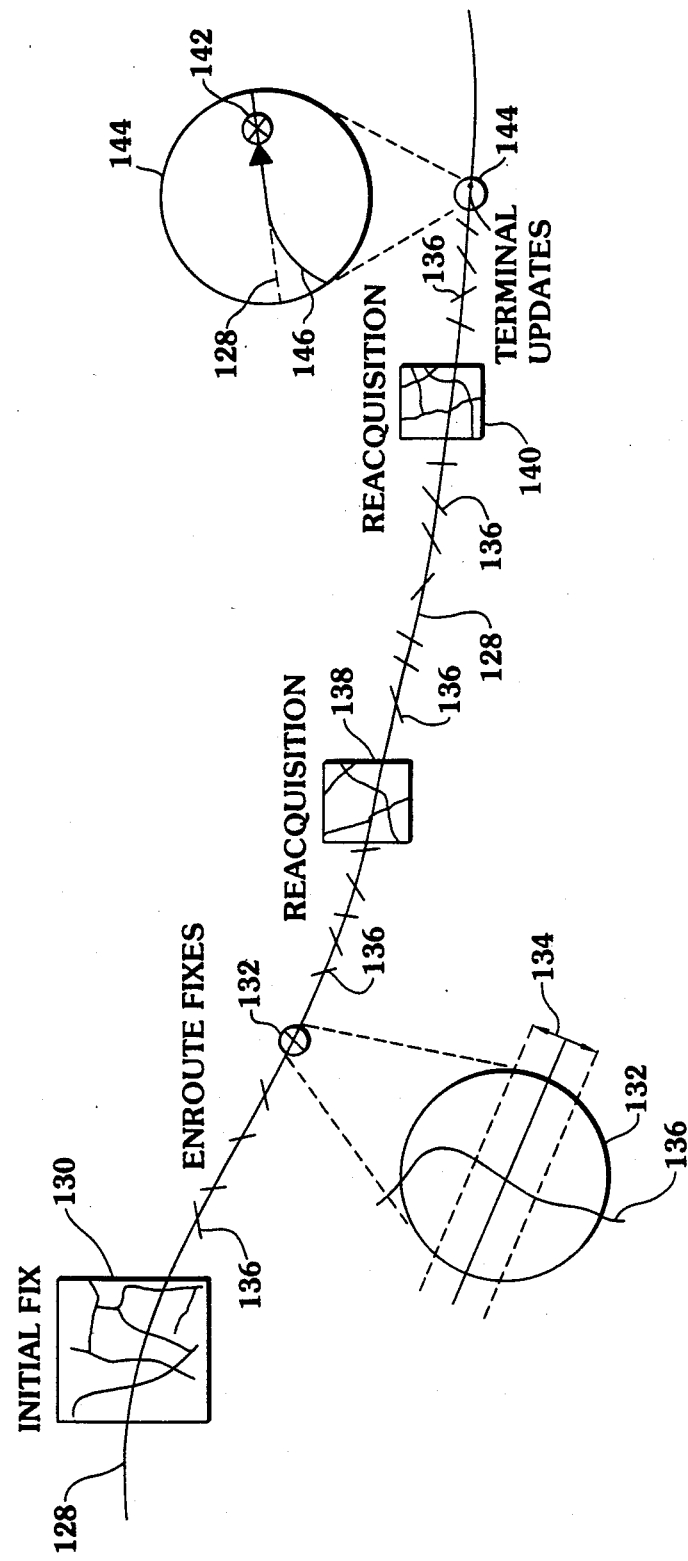
FIG. 7 is a schematic representation of an overall airborne vehicle flight path using both single feature and network feature navigation updates.

The integrated operation of the three systems (network position estimate 114, single feature acquisition 102 and feature tracking 126) for a typical manned aircraft or missile mission is illustrated in FIG. 7. As the vehicle flies along flight path 128 a network update 130 is performed first to reduce the large position uncertainty which may have occurred since launch or a long overwater flight portion. This initial coarse fix is performed as described in conjunction with FIGS. 3(a) and 3(b), above. Single feature updates are performed periodically enroute, as indicated by enlarged section 132. So long as the vehicle remains within a corridor indicated by line 134, accurate updates can be obtained from single features, as described in conjunction with FIGS. 1 and 2, above. Single linear feature navigation is unique among navigation updata methods because it can derive position updates using only one-dimensional data, whereas prior methods require at least two-dimensions data. Since linear features are quite prevalent and the single point mapping system uses relatively little computer memory, frequent navigation updates (on the order of twice a minute) are possible. With these frequent updates, the inertial navigation system has little time to drift off course. Thus, lightweight, simple and inexpensive inertial navigation systems can be used compared to those required for TERCOM systems where updates typically average 2 to 3 times per hour.

As the vehicle continues along flight path 128 in FIG. 7, it passes a number of linear features 136 providing frequent updates. Occasional network updates may be provided, such as at 138 and 140 to assure that the desired flight path is maintained even if the vehicle should stray out of corridor 134, such as after flying a distance over water or over an area with few linear features.

As vehicle nears target 142, final direction can be provided by another network update, if desired, or the direct use of features as described in FIGS. 4 and 5 can be used. As illustrated in enlarged section 144, where a road 146 goes directly to the target, feature tracking as shown in FIG. 4 can be used. Here, when vehicle sensors pick up road 146, the vehicle is caused to fly along the road to target 142. The accuracy achieved by tracking features to the terminal point is better than one-half of the width of the feature, e.g., the road, railroad etc., being tracked. This accuracy exceeds that obtained from any other current navigation methods.

Other variations, applications and ramifications of this invention will occur to those skilled in the art. Those are intended to be included within the scope of the invention as defined by the appended claims.

We claim:

1. A method of airborne vehicle navigation using linear feature orientation which consists of the steps of:
preparing a map of extended, substantially one-dimensional linear features along a path to be flown;
flying the airborne vehicle along the initial portion of said path;
detecting the location and direction of said linear features as said vehicle flys over them;
comparing the locations and directions of the detected features relative to the corresponding features on the map;
determining the actual location of the vehicle relative to the center of the intended flight path; and
correcting the actual vehicle flight path to return to the intended path.

2. The method according to claim 1 wherein said detection is accomplished by an active sensor looking ahead of the vehicle flight path.

3. The method according to claim 1 wherein said detection is accomplished by laser radar ranging ahead of said vehicle.

4. The method according to claim 1 wherever said detection is accomplished by a passive sensing means sensing the area immediately below the vehicle.

5. The method according to claim 1 wherein said detection is accomplished by a television imaging system directed below the vehicle.

6. The method according to claim 1 wherein said vehicle is navigated from launch to the first linear feature navigation correction and between and subsequent corrections by inertial navigation methods.

7. The method according to claim 1 wherein said corrections are made from about 1 to 120 times per hour of flight.

8. A method of airborne vehicle navigation using linear feature sequence matching which consists of:
preparing a map of extended, substantially one-dimensional linear features along a selected path to be flown;
flying an airborne vehicle along the initial portion of said path;
detecting linear ground features as the vehicle crosses them;
recording the current position as each feature is crossed, the distances between each pair of crossings and the vehicle movement direction between each pair of crossings to produce an X, Y vector distance between each pair of crossings;
shifting the map network between each pair of crossings through the vector distance;
recording all intersection positions between the shifted and unshifted maps;
accumulating votes at each position through a plurality of successive crossings;
projecting forward the votes from earlier crossings to the $N^{th}$ crossing;
whereby the position having the most votes at the $N^{th}$ crossing is the actual location;
correcting the actual vehicle flight path to return the vehicle to the desired flight path.

9. The method according to claim 8 wherein said detection is accomplished by an active sensor looking ahead of the vehicle flight path.

10. The method according to claim 8 wherein said detection is accomplished by laser radar ranging ahead of said vehicle.

11. The method according to claim 8 wherever said detection is accomplished by a passive sensing means sensing the area immediately below the vehicle.

12. The method according to claim 8 wherein said detection is accomplished by a television imaging system directed below the vehicle.

13. The method according to claim 8 wherein said vehicle is navigated from launch to the first linear feature navigation correction and between and subsequent corrections by inertial navigation methods.

14. A method of airborne vehicle navigation using linear feature tracking which consists of:
preparing a map of extended, substantially one-dimensional linear features along a selected path to be flown;
flying an airborne vehicle along at least the initial portion of said path until a selected linear feature is approached which extends to the vehicle destination;
sensing said selected linear feature when reached by said vehicle;
guiding said vehicle along said selected linear feature; and
continuing flight until said destination is reached.

15. The method according to claim 14 wherein:
said selected linear feature passes near, but not directly to, the vehicle destination;
as said vehicle is guided toward the destination vicinity along said selected feature, detecting an anomaly in said selected feature near said destination;
at a selected distance from said anomaly, turning the flight path of said vehicle through a selected angle to cause said vehicle to fly directly to said destination.

16. The method according to claim 15 wherein said sensing is accomplished by a television imaging system directed forward of vehicle.

17. The method according to claim 15 wherein said vehicle is navigated from launch to the first linear feature navigation correction and between and subsequent corrections by inertial navigation methods.

18. A system for airborne vehicle navigation using linear feature orientation which comprises:
sensor means for detecting the presence and orientation of extended, substantially one-dimensional linear feature on the surface of the earth as the sensor-bearing airborne vehicle encounters them;
a reference map of linear features along a corridor which includes the intended flight path;
means for comparing the sensed linear feature locations and orientations to features on said map;
means for correlating the sensed features and mapped features to determine the actual location and flight path of the vehicle; and
means for correcting the vehicle flight path to return to the intended flight path.

19. The system according to claim 18 wherein said sensor means comprises a laser radar ranging ahead of said vehicle.

20. The system according to claim 18 wherein said sensor means comprises a television imaging system sensing the area immediately forward of the vehicle.

21. The system according to claim 18 features including inertial navigation means for navigating the vehicle between linear feature navigation updates.

22. In a navigation system for an unmanned airborne vehicle which comprises vehicle propulsion and steering means for flying said vehicle along a selected path, an inertial navigation system for guiding said vehicle approximately along said path, the improvement comprising linear feature orientation means for updating and correcting said inertial navigation system, said orientation means comprising:

sensor means for detecting the presence and orientation of linear feature on the surface of the earth as the sensor-bearing airborne vehicle encounters them;

a reference map of linear features along a corridor which includes the intended flight path;

means for comparing the sensed linear feature locations and orientations to features on said map;

means for correlating the sensed features and mapped features to determine the actual location and flight path of the vehicle; and means for correcting the vehicle flight path to return to the intended flight path.

23. The system according to claim 22 wherein said sensor means comprises a laser radar ranging ahead of said vehicle.

24. The system according to claim 22 wherein said sensor means comprises a television imaging system sensing the area immediately forward of the vehicle.

25. The system according to claim 22 wherein said comparison means comprises:

means for recording the current position as each sensed linear feature is crossed by said vehicle, the distance between each pair of crossings and the vehicle movement direction between each pair of crossings to produce an X, Y, vector distance between each pair of crossings;

means for shifting the map network between each pair of crossings through the vector distance and recording all intersection positions between the shifted and unshifted maps;

means for accumulating votes at each position through a plurality of successive crossings and projecting forward the votes from the earlier crossings to the $N^{th}$ crossing to determine that the position with the most votes is the actual position; and means for directing the actual position information to void inertial navigation undating and connecting means.

* * * * *